United States Patent
Klein Koerkamp et al.

(10) Patent No.: US 9,387,666 B2
(45) Date of Patent: *Jul. 12, 2016

(54) METHOD FOR GENERATING RELIEF PRINTS

(71) Applicant: OCE-TECHNOLOGIES B.V., Venlo (NL)

(72) Inventors: Koen J. Klein Koerkamp, Venlo (NL); Jacques C. E. Pervillé, Fontenay sous Bois (FR)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,208

(22) Filed: Feb. 3, 2015

(65) Prior Publication Data
US 2015/0144014 A1 May 28, 2015

Related U.S. Application Data

(63) Continuation of application No. 13/906,676, filed on May 31, 2013, now Pat. No. 8,976,415.

(30) Foreign Application Priority Data

Jun. 8, 2012 (EP) .................................. 12305662

(51) Int. Cl.
*G06K 15/00* (2006.01)
*H04N 1/46* (2006.01)
*B41F 33/00* (2006.01)
*H04N 1/54* (2006.01)
*H04N 1/60* (2006.01)
*B05D 5/06* (2006.01)

(52) U.S. Cl.
CPC .............. *B41F 33/0009* (2013.01); *B05D 5/06* (2013.01); *H04N 1/54* (2013.01); *H04N 1/60* (2013.01)

(58) Field of Classification Search
None
See application file for complete search history.

(56) References Cited

U.S. PATENT DOCUMENTS

| 7,589,868 | B2 | 9/2009 | Velde et al. | |
|---|---|---|---|---|
| 8,976,415 | B2 * | 3/2015 | Klein Koerkamp | B05D 5/06 358/2.1 |
| 2004/0036896 | A1 | 2/2004 | Yamauchi et al. | |
| 2011/0193871 | A1 | 8/2011 | Dunn | |
| 2013/0192479 | A1 | 8/2013 | Cohen et al. | |

FOREIGN PATENT DOCUMENTS

| EP | 2 161 137 A1 | 3/2010 |
|---|---|---|
| JP | 2008-188826 A | 8/2008 |

* cited by examiner

*Primary Examiner* — Thomas D Lee
(74) *Attorney, Agent, or Firm* — Birch, Stewart, Kolasch & Birch, LLP

(57) ABSTRACT

A method is provided for processing a relief raster image, comprising customary color channels for indicating a color of each pixel and a height channel for indicating a height of each pixel into several pass images that are printed using a printer with several colorants including a white colorant. For each pixel a relief part, a white part and a skin part are discriminated in order to combine the demands for height and color variation across the surface of the image. The skin part comprises pixels for which a colorant composition based on the color channels of the relief raster image is established. In order to print a color in the skin part that is independent of a height of the pixel, the relief part comprises an arbitrary colorant composition and the white part comprises mainly white colorant.

8 Claims, 2 Drawing Sheets

METHOD FOR GENERATING RELIEF PRINTS

This application is a Continuation of co-pending U.S. application Ser. No. 13/906,676, filed May 31, 2013 which claims priority to application No. 12305662.4, filed in Europe on Jun. 8, 2012. The entirety of each of the above-identified applications is incorporated herein by reference.

BACKGROUND OF THE INVENTION

1. Field of the Invention

The present invention relates to a method for generating a relief print on a substantially flat substrate, wherein palpable differences exist between a height of various parts of the relief print, by a printer comprising a number of colorants including a white colorant, said printer being configured to print a relief print in a number of passes. The present invention further relates to a computer program product, including computer readable code embodied on a computer readable medium, said computer readable code comprising instructions for generating a relief print and to a print system configured to generate relief prints.

2. Description of the Related Art

Print systems usually apply colorants on a substrate in the form of toner or ink according to a digitally defined, two-dimensional pattern of pixels with values that indicate a composition of these colorants. This pattern is generated out of a digital image, that may comprise objects in either vectorized or rasterized format, using conventional techniques like interpretation, rendering, and screening by a raster image processor. The processing of a digital image includes color management to convert color values of the pixels in the digital image into composition values related to the printer color space as is set up by the colorants of the print system. Depending on the intended print quality and the characteristics of the print process, the pixels of the pattern may be printed in more than one pass, wherein a position on the substrate has an opportunity to receive a colorant in one or more of the passes across the substrate. For every pass, a pass image is derived that contains pass pixels, which are the pixels for which a colorant is to be applied in that specific pass.

As an extension of the applications of these systems, a print may be made by stacking several colorants on the same substrate position on top of each other. The effect of this stacking depends on the properties of the colorant, but several colorants, such as UV curable ink or hot melt ink, will develop a height depending on the number of times a pixel is printed. Height differences between various pixels may create palpable differences between various parts of the print, giving the print a relief. Such prints are therefore termed relief prints. A pixel in a digital image that may lead to a relief print, is not only characterized by a color value, but additionally by a height value. The derivation of the pass images from a digital relief image, such that the relief print, made by successively printing the pass images on top of each other, is a physical representation of the relief image, is part of the rendering process in a relief print system.

Although a color and a height of the pixels in the digital image may be separately specified, there is a reciprocal relationship between the two. Printing a fixed colorant combination several times on top of each other makes the printed color in general more dark, thus limiting the obtainable gamut, which is the set of all possible colors that may be printed. In US Patent Application 2011/0193871, an accumulator of total consumed opacity is introduced to store an amount of opacity that is consumed by the already deposited layers. This opacity is allocated to the background on which a new layer is rasterized, which means that the colorant combination is adjusted along the height of the printed pixel. A disadvantage of this method is the reduction of the gamut as a result of the impossibility to generate the same colors on a dark background compared to the possible colors on a light background.

It is a desire to make relief prints with a varying height scale, keeping the pixel heights relative to each other constant. The absolute height scale is dependent on particular print conditions or parameter settings. A problem exists in obtaining a gamut of colors that is independent of the height of the pixels in a relief print. An object of the invention is to provide a method for deriving pass images for generating relief prints for which the gamut is independent of the height of the pixels.

SUMMARY OF THE INVENTION

According to the present invention, this object is achieved by a method for generating a relief print on a substantially flat substrate, wherein palpable differences exist between a height of various parts of the relief print, by a printer comprising a number of colorants including a white colorant, said printer being configured to print a relief print in a number of passes, the method comprising the steps of defining a rasterized relief image, comprising customary color channels for indicating a color of each pixel and a height channel for indicating a height of each pixel of the rasterized relief image, determining a height parameter for establishing an absolute height scale, discriminating in the rasterized relief image for each pixel from the substrate to the surface of the relief image a relief part, a white part and a skin part, deriving from the rasterized relief image a number of pass images to be printed on top of each other, each pass image comprising pass pixels for which a colorant composition is established, based on a part of the pixel to which the pass pixel contributes, printing said number of pass images in a predetermined order by applying said established colorant composition on a position of the substrate associated with a pixel in the relief image, wherein the relief part comprises an arbitrary colorant composition, the white part comprises mainly white colorant and the skin part comprises colorants according to a color as defined in the color channels.

The relief part gives the main part of the required height of a pixel. Any colorant may contribute to this part, since the white part, that is printed on top of it, conceals the underlying color. The relief part may have zero thickness for pixels that have a low height. In that case the white part may be sufficient to yield a pixel with the indicated low height. On top of the white part the skin part is printed. Since the color of the background is independent of the height of the pixel, the color of the skin part is independent too. Therefore, this method yields pass images for generating relief prints for which the gamut is independent of the height of the pixels.

In a further embodiment, a pass pixel is selected for a pass image based on the distance of the pass pixel to the substrate. This is in some print processes necessary as the height latitude may be smaller than the absolute height variation among the printed pixels. In some region of the image, the skin part of the pixels will be printed, whereas in other regions of the image the relief part of the pixels is printed. After reaching a limit of the height latitude of the print process, the distance between the substrate and a print element will have to be changed in order to get within the established height latitude. In that case, the pixels in region with a low height can not be printed anymore.

In a further embodiment, a pass pixel that contributes to the skin part of a pixel in the relief image is selected for a pass image only if none of the neighboring pass pixels contributes to the white part of a corresponding pixel. The color of a pixel is influenced by the colorant of a neighboring pixel, if it is printed at more or less the same height. If the white part of a neighboring pixel is at the same distance of the substrate or height as the skin part of a pixel, these two parts should not be printed in the same pass. Therefore, the pass pixel for printing the skin part is put in further pass image than the neighboring pass pixel.

In a further embodiment, a pass pixel that contributes to the skin part of a pixel in the relief image is selected for a pass image only if a predetermined number of pass images have been established between said pass image and the pass image in which the white part of the pixel in the relief image has been finished. The white part of a pixel in the relief image is not to be influencing the color of the colorants in the skin part. A predetermined number of pass images between the printing of the white part and the skin part gives an amount of time for the white part to be settled, e.g. to get solidified.

In a further embodiment, the white part of a pixel in the relief image is printed in a predetermined number of pass images. The white part is to conceal the colorants contributing to the relief part of a pixel. Depending on the print process and the opacity of the white colorant, a predetermined number of pass pixels on top of each other performs this function and provides a stable background for the skin part of the pixel.

It is understood that the various measures may be combined. The invention also relates to a computer program product, including computer readable code embodied on a computer readable medium, said computer readable code comprising instructions for executing the steps of receiving a rasterized relief image, comprising customary color channels for indicating a color of each pixel and a height channel for indicating a height of each pixel of the rasterized relief image, discriminating in the rasterized relief image for each pixel from the substrate to the surface of the relief image a relief part, a white part and a skin part, deriving from the rasterized relief image a number of pass images to be printed on top of each other, each pass image comprising pass pixels for which a colorant composition is established based on a part of the pixel to which the pass pixel contributes, transferring said pass images to a print engine, that comprises a white colorant and is configured to print the pass images in a predetermined order by applying said established colorant composition on a position of the substrate associated with a pixel in the relief image, wherein the relief part comprises an arbitrary colorant composition, the white part comprises mainly white colorant and the skin part comprises colorants according to a color as defined in the color channels. Moreover, the invention may be part of a print system configured to generate relief prints on a substantially flat substrate in a number of passes, wherein palpable differences exist between a height of various parts of the relief print, the print system comprising a print controller and a print engine, the print engine comprising a number of colorants including a white colorant, the print controller comprising receiving means for receiving a rasterized relief image, comprising customary color channels for indicating a color of each pixel and a height channel for indicating a height of each pixel of the rasterized relief image, discriminating means for discriminating in the rasterized relief image for each pixel from the substrate to the surface of the relief image a relief part, a white part and a skin part, deriving means for deriving from the rasterized relief image a number of pass images to be printed on top of each other, each pass image comprising pass pixels for which a colorant composition is established based on a part of the pixel to which the pass pixel contributes, and transferring means for transferring said pass images to the print engine, that is configured to print said number of pass images in a predetermined order by applying said established colorant composition on a position of the substrate associated with a pixel in the relief image, wherein the relief part comprises an arbitrary colorant composition, the white part comprises mainly white colorant and the skin part comprises colorants according to a color as defined in the color channels.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
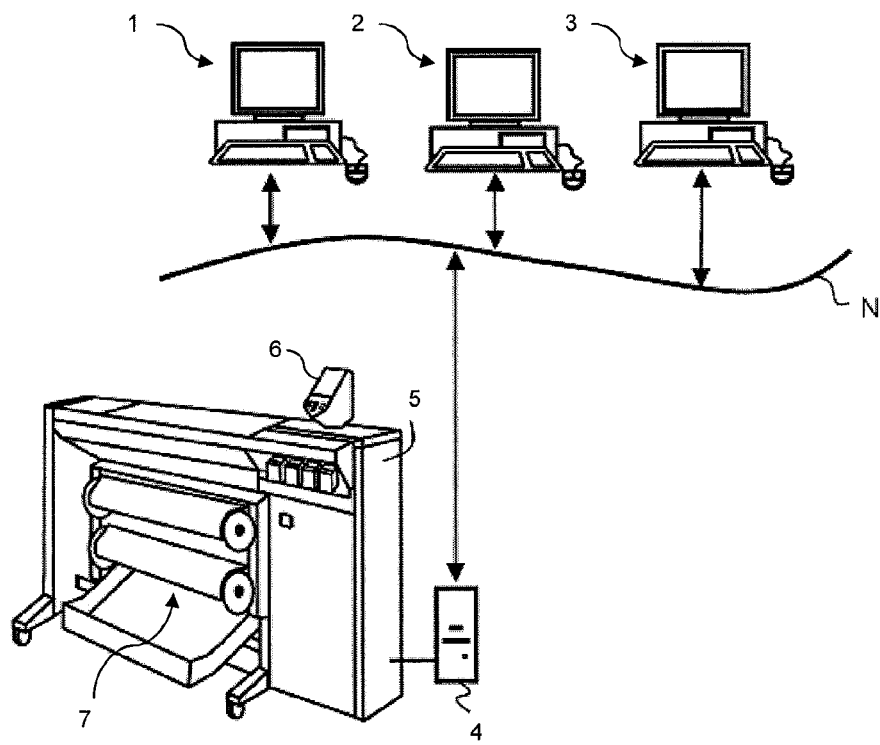
FIG. 1 is a print system in which the invented method is applicable.

FIG. 1 is a print system comprising a number of workstations 1, 2 and 3, which may be personal computers or other devices for preparing color image data for relief prints to be printed. These workstations have access to a network N for transferring the color image data to a print controller 4, that is configured to receive print jobs for relief prints and derive pass images. The print controller 4 is part of a printer that further comprises a print engine 5 for applying colorants, in this embodiment cyan (C), magenta (M), yellow (Y), black (K) and white (W) colorant, to a flat print medium, the substrate, in order to obtain a printed image. In this embodiment, a hot-melt ink is applied by print heads that reciprocally scan the substrate in a direction perpendicular to a transport direction. The ink solidifies upon cooling after printing on the substrate. The invention is equally well applicable using UV-curable inks that solidify after exposure to UV-light and other types of ink that are printed in a layer with some thickness on a substrate.

The medium is in print engine 5 provided from one of the rolls on position 7, but other print engines may be used that are suitable for printing on rigid elements, e.g. flatbed printers. Preferentially, the distance between the flat substrate and the print elements that are used to apply the various colorants, is variable. This distance may be varied after a number of passes have been printed in order to bring the relief surface within the latitude of the print elements. The latitude of the distance between a substrate of the scanning print head is in print engine 5 about 0.5 to 2 mm. The thickness of an individual printed pass pixel is about 20 µm. Hence, the maximum number of pass pixels on top of each other without changing the distance between the substrate and the print head is about 70.

The printer comprises a user interface 6, which, in this embodiment, is placed on the print engine, but which may also be placed on the printer controller, for selecting a print job and optionally adapt a print job parameter, such as an absolute height parameter for indicating a maximum height of the relief print. In this embodiment a maximum number of passes for one pixel is used as height parameter. In another embodiment, a user interface is provided as a network site that is accessible with a browser on a client computer.

After sending a print job comprising image data from a workstation to the printer controller, the print job will be made visible on the user interface. It may be scheduled for further processing after selection from a list of print jobs or, alternatively, if the print job is on top of the list of print jobs. The print job comprises parameter values that determine the way the image data are to be printed, such as the way how the image data are to be converted into print data.

One way to convert relief image data into pass images is to use an RGB (red, green, blue channels) to CMYW (cyan, magenta, yellow, white) conversion method. In this method, the RGB-channels having a value in the range [0,1] are converted to:

$$C=1-R; M=1-G; Y=1-B; W=\min(R, G, B). \quad (1)$$

The CMYW-channels define a colorant combination that is printed over the complete height of the pixel. A relative height channel is converted into an absolute thickness by a print parameter that indicates a maximum thickness, MT. Therefore, for every pixel a number of times a pass image is to use a colorant is given by:

$$TC=C/(C+M+Y+W)*MT*H,$$

$$TM=M/(C+M+Y+W)*MT*H,$$

$$TY=Y/(C+M+Y+W)*MT*H,$$

$$TW=W/(C+M+Y+W)*MT*H, \quad (2)$$

wherein H indicates the relative height of a pixel and the assumption is that the contribution to the height of a pixel is independent of the color of the colorant.

A standard color calibration may be made using an RGB input chart for a series of increasing thicknesses, and a color management tool converts the input colors of a digital image into RGB in dependence of the height of the pixel. It has been found that with this method, the gamut in a saturation direction depends on the height of a pixel.

Another method is therefore, to separate each pixel of the relief print into a relief part, a white part and a skin part. The relief part depends on the height of the pixel, that is calculated by a product of the relative thickness and said maximum thickness parameter, whereas the white part, consisting of white colorant, comprises a fixed number of pass pixels and the skin part comprises a colorant combination that is independent of the height. It may be calibrated by printing a standard test chart for a color management method that is suitable for standard flat prints.

Figure 2:
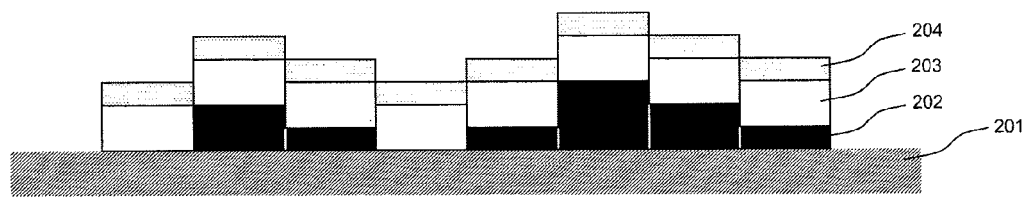
FIG. 2 is a crosscut of a relief print according to the present invention.

FIG. 2 is a crosscut of a relief print according to the present invention. On substrate 201 a number of pixels is printed comprising a relief part 202, a white part 203 and a skin part 204. The height variation of the individual pixels on the flat substrate 201 is caused by repetitive printing of colorants in the relief part 202. All available colorants may be used in the relief part, which provides for an optimal print speed for this part. The white part 203 is printed on top of the relief part 202 to conceal the colorants used therein and to provide a standard white background for the colorants in the skin part 204. The combination of colorants in the skin part is generated from a color management module that is calibrated for flat prints using the color channels of a rasterized digital image. Note that a predetermined thickness for the white part of the pixels is used, determined by the opacity of the white ink, which results in a background that is the same for all pixels.

Figure 3:
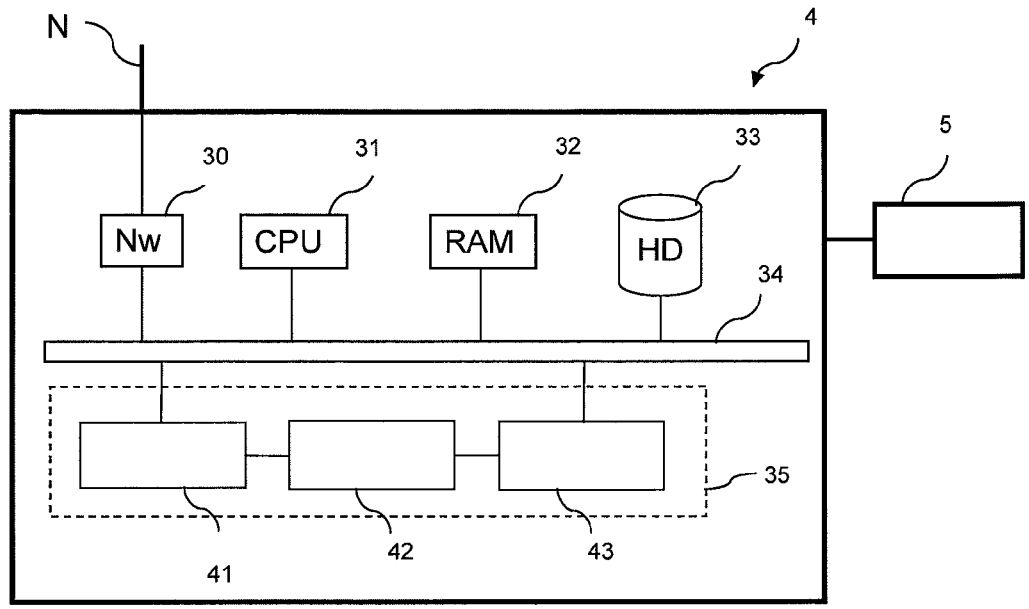
FIG. 3 is an arrangement of computer elements to implement the present invention.

FIG. 3 shows a configuration of the printer controller 4 with its connection to a network N and a print engine 5. The printer controller comprises a network adapter 30, a central processing unit 31, volatile memory 32 and non-volatile memory 33, all connected to a central bus for exchanging data, including color image data as received through the network. Furthermore, a raster image processor (RIP) 35 is part of the printer controller for converting the image data into pass images. In a first module 41, the image data are rasterized and for each pixel a relief part, a white part and a skin part is set. In module 42, a colorant composition is determined, depending on the part of the pixel. For the relief part, all colorants are equally used and the first available colorant is inserted. An alternative may be to use a colorant that is the least expensive one. For the white part, only the white colorant is used and for the skin part, a conversion of color data is performed using input and output color profiles as defined by the International Color Consortium. In module 43, the skin part of the pixels is screened or halftoned and the pass images are composed that comprise the pass pixels that are printed successively on top of each other. These pass images are saved in the order in which they are composed and may be sent to the print engine 5 or be saved for later reproduction. If a pass pixel is not inserted in a pass image, because a neighboring pass pixel contributes to the white part of a corresponding pixel in the relief print, the pass pixel is saved and inserted in a next pass image. Neighboring pixels in this embodiment are pixels that are part of the Moore neighborhood of a pixel in the two-dimensional rasterized image.

Figure 4:
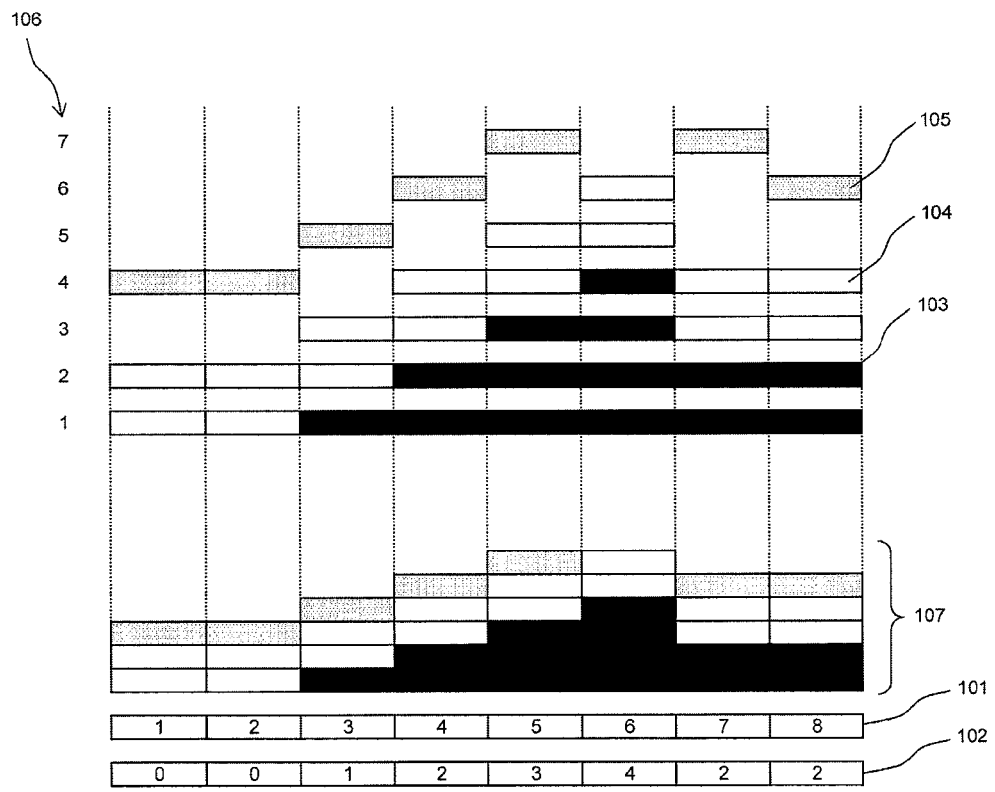
FIG. 4 shows how various pass pixels contribute to a relief print.

FIG. 4 shows how the pass images are composed for a part of a relief print as indicated by a crosscut 107 through a number of pixels in a relief print. Pixel numbering bar 101 indicates the number of eight pixels. For each pixel, a number of pass pixels contributing to the relief part of the pixel is given in bar 102. This is based on the (relative) height of the pixel in the image data and a print parameter that indicates a maximum height. Two pass pixels of white colorant are applied for each pixel and one pass pixel is used in the skin part. Above crosscut 107, a number of pass images is shown that have been used to obtain the relief print. The pass images are indexed by a number 106 and comprise a pass pixel for the relief part 103, a pass pixel for the white part 104 and a pass pixel for the skin part 105. Pass pixels for the relief part and the white part are placed in one pass image as can be seen in the pass images 1, 2, 3 and 4. In contrast, a pass pixel for the skin part is printed after one pass image has been printed without a pass pixel contributing to the pixel in the relief image as in pixel number 1, wherein the last white part pass pixel is printed in pass image 2 and the skin part pass pixel is printed in pass image 4. Note that for pixel 6 no skin part pass pixel is printed, which is the result of the screening operation in module 43. For pixel 7, the skin part pass pixel is printed in pass image 7, since pass image 6 comprises a white part pass pixel for its neighbor pixel 6.

The above disclosure is intended as merely exemplary, and not to limit the scope of the invention, which is to be determined by reference to the following claims.

The invention claimed is:

1. A method for generating a relief print on a substantially flat substrate, wherein palpable differences exist between a height of various parts of the relief print, by a printer comprising a number of colorants including a white colorant, said printer being configured to print a relief print in a number of passes, the method comprising the steps of:

defining a relief raster image, comprising customary color channels for indicating a color of each pixel and a height channel for indicating a height of each pixel of the relief raster image;

discriminating in the relief raster image for each pixel a relief part, a white part and a skin part, the parts constituting the height of the pixel;

deriving from the relief raster image a number of pass images to be printed on top of each other, each pass image comprising pass pixels for which a colorant composition is established based on a part of the pixel to which the pass pixel contributes; and printing said number of pass images by applying said established colorant composition on a position of the substrate associated with a pixel in the relief raster image, wherein the relief part comprises an arbitrary colorant composition, the white part comprises mainly white colorant and the skin part comprises colorants according to a color as defined in the color channels.

2. The method according to claim 1, wherein a pass pixel is selected for a pass image based on a distance of the pass pixel to the substrate.

3. The method according to claim 1, wherein a pass pixel that contributes to the skin part of a pixel in the relief raster image is selected for a pass image only if none of the neighboring pass pixels contributes to the white part of a corresponding pixel.

4. The method according to claim 1, wherein a pass pixel that contributes to the skin part of a pixel in the relief image is selected for a pass image only if a predetermined number of pass images have been established between said pass image and the pass image in which the white part of the pixel in the relief image has been finished.

5. The method according to claim 1, wherein the white part of a pixel in the relief image is printed in a predetermined number of pass images.

6. The method according to claim 1, wherein the composition of colorants in the skin part of a pixel is established by application of a color management module using the color channels of the relief raster image, independent of the height channel.

7. A computer program product, including computer readable code embodied on a non-transitory computer readable medium, said computer readable code comprising instructions for executing the steps of:

receiving a relief raster image, comprising customary color channels for indicating a color of each pixel and a height channel for indicating a height of each pixel of the relief raster image;

discriminating in the relief raster image for each pixel a relief part, a white part and a skin part, the parts constituting the height of the pixel;

deriving from the relief raster image a number of pass images to be printed on top of each other, each pass image comprising pass pixels for which a colorant composition is established based on a part of the pixel to which the pass pixel contributes; and transferring said pass images to a print engine, that comprises a white colorant and is configured to print the pass images in a predetermined order by applying said established colorant composition on a position of the substrate associated with a pixel in the relief raster image, wherein the relief part comprises an arbitrary colorant composition, the white part comprises mainly white colorant and the skin part comprises colorants according to a color as defined in the color channels.

8. A print system configured to generate relief prints on a substantially flat substrate in a number of passes, wherein palpable differences exist between a height of various parts of the relief print, the print system comprising:

a print controller; and a print engine, the print engine comprising a number of colorants including a white colorant, wherein the print controller is configured to:

receive a relief raster image, comprising customary color channels for indicating a color of each pixel and a height channel for indicating a height of each pixel of the relief raster image;

discriminate in the relief raster image for each pixel a relief part, a white part and a skin part;

derive from the relief raster image a number of pass images to be printed on top of each other, each pass image comprising pass pixels for which a colorant composition is established based on a part of the pixel to which the pass pixel contributes; and transfer said pass images to the print engine, that is configured to print said number of pass images in a predetermined order by applying said established colorant composition on a position of the substrate associated with a pixel in the relief raster image, wherein the relief part comprises an arbitrary colorant composition, the white part comprises mainly white colorant and the skin part comprises colorants according to a color as defined in the color channels.

* * * * *